US006631638B2

(12) United States Patent
James et al.

(10) Patent No.: US 6,631,638 B2
(45) Date of Patent: Oct. 14, 2003

(54) FLUID FLOW SENSOR

(75) Inventors: Steven D. James, Edina, MN (US); William G. Kunik, Lakeville, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 0 days.

(21) Appl. No.: 09/772,677

(22) Filed: Jan. 30, 2001

(65) Prior Publication Data

US 2002/0100316 A1 Aug. 1, 2002

(51) Int. Cl.$^7$ ............................................. B01F 1/68
(52) U.S. Cl. .................................................. 73/204.26
(58) Field of Search ....................... 73/204.26, 204.16, 73/204, 195, 204.11, 204.15, 204.17, 204.23, 189, 204.19, 204.27, 115, 25.03, 118.2; 364/557; 374/44

(56) References Cited

U.S. PATENT DOCUMENTS

| 3,677,085 A | 7/1972 | Hayakawa |
| 3,881,181 A | 4/1975 | Khajezadeh ............... 357/69 |
| 3,931,736 A | 1/1976 | Olmstead ..................... 73/204 |
| 3,988,928 A | 11/1976 | Edstrom et al. ............... 73/204 |
| 3,991,613 A | 11/1976 | Adler et al. ................... 73/194 |
| 3,995,481 A | 12/1976 | Djorup |
| 3,996,799 A | 12/1976 | van Putten ................... 73/204 |
| 4,024,761 A | 5/1977 | Djorup |
| 4,089,214 A | 5/1978 | Egami et al. ................... 73/116 |
| 4,135,396 A | 1/1979 | Stanke et al. |
| 4,320,655 A | 3/1982 | Kammermaier et al. ...... 73/204 |
| 4,331,036 A | 5/1982 | Severson et al. ........ 73/861.05 |
| 4,332,157 A | 6/1982 | Zemel et al. ................... 73/26 |
| 4,345,465 A | 8/1982 | Gruner et al. ................. 73/204 |
| 4,391,137 A | 7/1983 | Kerfoot et al. |
| 4,399,698 A | 8/1983 | Hiromasa et al. ............. 73/204 |
| 4,449,397 A | * 5/1984 | Lauterbach ................. 73/118.1 |
| 4,462,262 A | 7/1984 | Kahnke ................... 73/861.05 |
| 4,472,239 A | 9/1984 | Johnson et al. ............. 156/647 |
| 4,478,076 A | 10/1984 | Bohrer ........................ 73/204 |

(List continued on next page.)

FOREIGN PATENT DOCUMENTS

| EP | 019135 B1 | 4/1980 |
| EP | 019135 A2 | 4/1980 |
| EP | 0021291 | 3/1982 |
| EP | 203622 B1 | 2/1986 |
| EP | 0285451 B1 | 10/1988 |
| EP | 0285451 A1 | 10/1988 |
| EP | 490764 B1 | 12/1991 |
| GB | 2171800 | 9/1986 |
| JP | 594722 1 | 3/1959 |
| JP | 61-87385 | 5/1986 |
| WO | 890351 2 | 4/1989 |
| WO | 985076 3 | 11/1998 |

OTHER PUBLICATIONS

Masayoshi Esashi, "Micro Flow Sensor and Integrated Magnetic Oxygen Sensor Using It", 1991 International Conference on Solid State Sensors and Actuators. Jun. 24–27, 1991, San Francisco, CA pp. 34–37.

D. Moser, et al., "Silicon Gas Flow Sensors Using Industrial CMOS and Bipolar IC Technology", *Sensors and Actuators A*, 25–27, 1991, pp. 577–581.

(List continued on next page.)

*Primary Examiner*—Edward Lefkowitz
*Assistant Examiner*—Jewel V. Thompson

(57) ABSTRACT

A flow sensor for determining the velocity and direction of a fluid flow including a substrate, a heat source located on the substrate, and a first and a second heat sensor located on the substrate to detect at least a portion of heat generated by the heat source. The first and second heat sensors and the heat source are arranged in a non-linear orientation.

57 Claims, 10 Drawing Sheets

U.S. PATENT DOCUMENTS

| | | | |
|---|---|---|---|
| 4,478,077 A | 10/1984 | Bohrer et al. | 73/204 |
| 4,498,337 A | 2/1985 | Gruner | 73/204 |
| 4,501,144 A | 2/1985 | Higashi et al. | 73/204 |
| 4,542,650 A | 9/1985 | Renken et al. | 73/204 |
| 4,548,077 A | 10/1985 | van Putten | 73/204 |
| 4,548,078 A | 10/1985 | Bohrer et al. | 73/204 |
| 4,555,939 A | 12/1985 | Bohrer et al. | 73/198 |
| 4,566,320 A | 1/1986 | Bohrer | 73/204 |
| 4,576,050 A | 3/1986 | Lambert | |
| 4,587,843 A | 5/1986 | Tokura et al. | |
| 4,594,889 A | 6/1986 | McCarthy | 73/204 |
| 4,624,137 A | 11/1986 | Johnson et al. | 73/204 |
| 4,637,253 A | 1/1987 | Sekimura et al. | |
| 4,651,564 A | 3/1987 | Johnson et al. | 73/204 |
| 4,680,963 A | 7/1987 | Tabata et al. | 73/204 |
| 4,682,503 A | 7/1987 | Higashi et al. | 73/755 |
| 4,696,188 A | 9/1987 | Higashi | 73/204 |
| 4,735,099 A | 4/1988 | Ohta et al. | 73/204 |
| 4,784,721 A | 11/1988 | Holmen et al. | 156/647 |
| 4,790,181 A | 12/1988 | Aine | 73/204.18 |
| 4,843,445 A | 6/1989 | Stemme | 357/28 |
| 4,870,860 A | 10/1989 | Ohta et al. | 73/204.26 |
| 4,885,937 A * | 12/1989 | Tanaka et al. | 73/189 |
| 4,895,616 A | 1/1990 | Higashi et al. | 156/647 |
| 4,914,742 A | 4/1990 | Higashi et al. | 357/26 |
| 4,930,347 A | 6/1990 | Henderson | 73/189 |
| 4,966,037 A | 10/1990 | Sumner et al. | 73/204.26 |
| 5,228,333 A * | 7/1993 | Kleinschmidt et al. | 73/115 |
| 5,231,877 A | 8/1993 | Henderson | 73/204.25 |
| 5,231,878 A | 8/1993 | Zanini-Fisher et al. | 73/204.26 |
| 5,237,867 A * | 8/1993 | Cook, Jr. | 73/204.15 |
| 5,295,389 A * | 3/1994 | Nagata et al. | 73/25.03 |
| 5,321,983 A * | 6/1994 | Nagata | 73/204.18 |
| 5,467,649 A | 11/1995 | Reihlen et al. | 73/204.26 |
| 5,663,508 A | 9/1997 | Sparks | 73/861.71 |
| 5,852,239 A * | 12/1998 | Sato et al. | 73/204.26 |
| 5,852,308 A | 12/1998 | Wood | 257/252 |
| 5,861,545 A | 1/1999 | Wood | 73/23.31 |
| 5,869,749 A | 2/1999 | Bonne et al. | 73/53.01 |
| 5,892,140 A | 4/1999 | Wood | 73/310 |
| 5,995,209 A | 11/1999 | Ohman et al. | 356/72 |
| 6,132,083 A * | 10/2000 | Enala | 374/44 |

OTHER PUBLICATIONS

G. Wachutka, et al., "Analytical 2D–Model of CMOS MicroMachined Gas Flow Sensors", *Transducers '91. 1991 International Conference of Solid–State Sensors and Actuators, Digest of Technical Papers*, Jun. 24–27, 1991, San Francisco, CA, pp. 22–25.

N.R. Swart, et al., "Flow–rate microsensor modelling and optimization using SPICE*", *Sensors and Actuators A, 34*, 1992, pp. 109–122.

Scott W. Ma, Ph.D., "Forced covection heat transfer from microstructures", 1992, 1–88.

Michael J. Moen, et al., "The Effect of Sensor Size and Substrate Properties On the Performance of Flush–Mounted Hot–Film Sensors", *Conference: Proceedings of the Fluids Engineering Conference, Fed*—vol. 167, *Thermal Anemometry*, 1993, pp. 249–261.

U. Dillner, "Thermal modeling of multilayer membranes for sensor applications*", *Sensors and Actuators A, 41–42*, 1994, pp. 260–267.

Jin–Biao Huang, et al., "Micro Thermal Shear Stress Sensor with and without Cavity underneath", Mechanical, Aerospace, and Nuclear Engineering Department, University of California, 6/95, pp. 171–174.

N.T. Nguyen, et al., "Low–cost silicon sensors for mass flow measurement of liquids and gases", *Sensors and Actuators A 49*, 1995, pp. 17–20.

Jin–Biao Huang, et al., "Fluidic Shear–Stress Measurement Using Surface–Micromachined Sensors", *IEEE 1995 Region 10 Conference on Microelectronics and VLSI*, Hong Kong, Nov., 1995, pp. 570–574.

Jiang, J. and C. Ho, "Polysilicon Structures For Shear Stress Sensors", 1995, pp. 12–15.

Li Qui, et al., "A Microsensor With Integrated Heat Sink and Flow Guide For Gas Flow Sensing Applications", *Transducers '95—Eurosensors IX, The 8$^{th}$ International Conference on Solid–State Sensors and Actuators, and Eurosensors IX*, Jun. 25–29, 1995, Stockholm, Sweden, pp. 520–523.

Huibert–Jan Verhoeven, et al., "Design of Integrated Thermal Flow Sensors Using Thermal Sigma–Delta Modulation", *Transducers '95—Eurosensors IX, The 8$^{th}$ International Conference on Solid–State Sensors and Actuators, and Eurosensors IX*, Jun. 25–29, 1995, Stockholm, Sweden, pp. 532–535.

R. Kersjes, et al. "An Invasive Catheter Flow Sensor With On–Chip CMOS Read–Out Electronics For the Online Determination of Blood Flow", *Transducers '95—Eurosensors IX, The 8$^{th}$ International Conference on Solid–State Sensors and Actuators, and Eurosensors IX*, Jun. 25–29, 1995, Stockholm, Sweden, pp. 432–435.

Edvard Kalvesten, et al., "An Integrated Pressure–Flow Sensor For Correlation Measurements In Turbulent Gas Flows", *Transducers '95—Eurosensors IX, The 8$^{th}$ International Conference on Solid–State Sensors and Actuators, and Eurosensors IX*, Jun. 25, 29, 1995, Stockholm, Sweden, pp. 428–431.

Tokudai Neda, et al., "A Polysilicon Flow Sensor For Gas Flowmeters", *Transducers '95—Eurosensors IX, The 8$^{th}$ International Conference on Solid–State Sensors and Actuators, and Eurosensors IX*, Jun. 25–29, 1995, Stockholm, Sweden, pp. 548–551.

F. Mayer, et al., "Influence of Design Geometry and Packaging On the Response of Thermal CMOS Flow Sensors", *Transducers '95—Eurosensors IX, The 8$^{th}$ International Conference on Solid–State Sensors and Actuators, and Eurosensors IX*, Jun. 25–29, 1995, Stockholm, Sweden, pp. 528–531.

Timothy M. Betzner, et al., "Structural Design and Characteristics Of A Thermally Isolated, Sensitivity–enhanced, Bulk–micromachined, Silicon flow sensor", *J. Micromech, Microeng.* 6, 1996, pp. 217–227.

Jin–Biao Huang, et al., "Improved Micro Thermal Shear–Stress Sensor", *IEEE Transactions On Instrumentation and Measurement*, vol. 45, No. 2, 4/96, pp. 570–574.

Michael Mullins, et al., "Design and Fabrication of Single–Chip Intellignet Silicon Thermal Flow Sensors In Standard CMOS Technology", 1996, pp. 14/1–14/4.

Fukang Jiang, et al., "A Surface–Micromachined Shear Stress Imager", *IEEE*, 6/96, pp. 110–115.

L. Lofdahl, et al., "An Integrated Silicon Based Wall Pressure–Shear Stress Sensor For Measurements In Turbulent Flows", *DSC*—vol. 59, *Microelectromechanical Systems (MEMS)*, 1996, pp. 245–251.

P.T. Lai, et al., "Monolithic Integrated Spreading–Resistance Silicon Flow Sensor", *Sensors and Actuators A 58*, 1997, pp. 85–88.

Motoaki Kimura, et al., "MEMS for Aerodynamic Control", 28$^{th}$ AIAA Fluid Dynamics Conference, 4$^{th}$ AIAA Shear Flow Control Conference 6/97, pp. 1–8.

Fukang Jiang, et al., "A Flexible MEMS Technology and Its First Application To Shear Stress Sensor Skin", IEEE, 1997, pp. 465–470.

Yoshihiro Nagaoka, et al., "Shear Stress Measurements on an Airfoil Surface Using Micor–Machined Sensors*", ISME International Journal, Series B, vol. 40, No. 2, 1997, pp. 265–272.

Peter Norlin, et al., "A Chemical Micro Analysis System for the Measurement of Pressure, Flow Rate, Temperature, Conductivity, UV–absorption and Fluorescence", Sensors and Actuatros B 49, 2/98, pp. 34–39.

Henry Baltes, et al., "Micromachined Thermally Based CMOS Microsensors", Proceedings of the IEEE, vol. 86, No. 8, 8/98, pp. 1660–1678.

M. Gongora–Rubio, et al., "The utilization of low temperature co–fired ceramics (LTCC–ML) technology for meso–scale EMS, a simple thermistor based flow sensor", Sensors and Actuators A 73, 9/98, pp. 215–221.

Genevieve Comte–Bellot, "Hot–Wire Anemometry", The Handbook of Fluid Dynamics, 9/98, pp. 34–1—34–29.

Ulrich Bonne, "Packaging of Microsensors For Operation In Harsh Environments", Principal Research Fellow, Honeywell Technology Center, 2/99, pp. 1–9.

Chang Liu, et al., "A Micromachined Flow Shear–Stress Sensor Based On Thermal Transfer Principles", Journal of Microelectromechanical Systems, vol. 8, No. 1, 3/99, pp. 90–99.

Angela Rasmussen, et al., "The Design and Fabrication of Microfluidic Flow Sensors", IEEE, 5/99, pp. V–136—V–139.

T. S. J. Lammerink, et al., "A New Class of Thermal Flow Sensors Using $\Delta T=O$ as a Control Signal", IEEE, 4/00, pp. 525–530.

Nihat Okulan, et al., "A New Pulsed–Mode Micromachined Flow Sensor For An Integrated Microfluidic System", no date, pp. 1–4.

Fujii, T. et al., "Very Low Threshold GaAs–AIGaAs GRIN–SCH Lasers Grown by MBE for OEIC Applications," FUJITSU Scientific & Technical Journal, No. 4, pp. 421–426 (1985).

Okajima, M. et al., "Buried Multi–Heterostructure (BMH) GaAIAs Laser," Proceedings of the 13$^{th}$ Conference on Solid State Devices, Japanese Journal of Applied Physics, vol. 21, Supp. 21–1, pp. 353–358 (1981).

"Very Low Threshold Current Ridge–Waveguide AIGaAs/GaAs Single–Quantum–Well Lasers," Electronics Letters, vol. 21, No. 22 (1985).

Shotov, A.P. et al., "PbS/PbSSe/PbSnSe heterostructure lasers with separate electron and optical confinement fabricated by molecular epitaxy," Soviet Technical Physics Letters, 12, No. 11 (1986).

* cited by examiner

FLUID FLOW SENSOR

BACKGROUND OF THE INVENTION

The present invention is directed to a fluid flow sensor, and more particularly, to a thermal based thin film sensor for determining the velocity of fluid flow.

Thermal based thin film systems are typically used as flow sensors to determine the velocity of gas flowing over the sensor. When fluid flows over the sensor, the flow distorts a set of generated isotherms (i.e., the heat field) which can be at least partially detected by a heat sensor. Typically, a plurality of such fluid flow sensors are located on a surface, such as an air foil, where local velocity, temperature, angle of attack and angle of sideslip of the fluid flow are of critical interest. Furthermore, ground or flight based weather anemometry requires both a direction and a magnitude of air flow. In order to measure both the direction and velocity of the fluid flow, a plurality of fluid flow sensors are typically spaced across the surface of interest.

When the fluid flow reaches higher velocities, the temperature of the heat source must be increased to accurately measure velocity. However, the temperature of the heat source can be increased to only a certain level before the heat source and/or sensor is damaged. When the fluid reaches a speed above that which can be sensed by the thin film sensor, a system of pressure sensors spaced across the surface are typically utilized to determine velocity of the flow. Each pressure sensor is pneumatically connected to the surface by a pressure tap.

In such a system described above, a plurality of sensors and a plurality of pressure sensors must be located across the surface. Each individual pressure and heat sensor must be mounted to the surface and connected to a processor. Each additional sensor also requires additional power. Furthermore, the resultant array of sensors may also create a relatively highly observable feature on the surface with respect to radar and infrared signatures.

Accordingly, there is a need for a small, compact, and efficient flow sensor that can accurately measure a wide range of flow velocities and directions.

SUMMARY OF THE INVENTION

In one embodiment, the present invention is a flow sensor which includes a central heat source and a pair of non-linearly aligned heat sensors such that the sensor, acting alone, can accurately determine the direction and magnitude of the fluid flow. The sensor may include an integral pressure sensor, thereby eliminating the need for separate pressure taps and pressure sensors on the surface and increasing the dynamic range of the sensor (i.e. the range of velocities that can be measured by the sensor). The sensor may also include a substrate temperature sensor for sensing the temperature of the substrate of the sensor. The sensor may also include an isolated fluid temperature sensor to measure the temperature of the surrounding fluid.

In one embodiment, the invention is a flow sensor for determining the velocity and direction of a fluid flow including a die, a heat source located on the die, and a first and a second heat sensor located on the die to detect at least a portion of heat generated by the heat source. The first and second heat sensors and the heat source are arranged in a non-linear orientation.

Other objects and advantages of the present invention will be apparent from the following description and the accompanying drawings.

DETAILED DESCRIPTION

Figure 1:
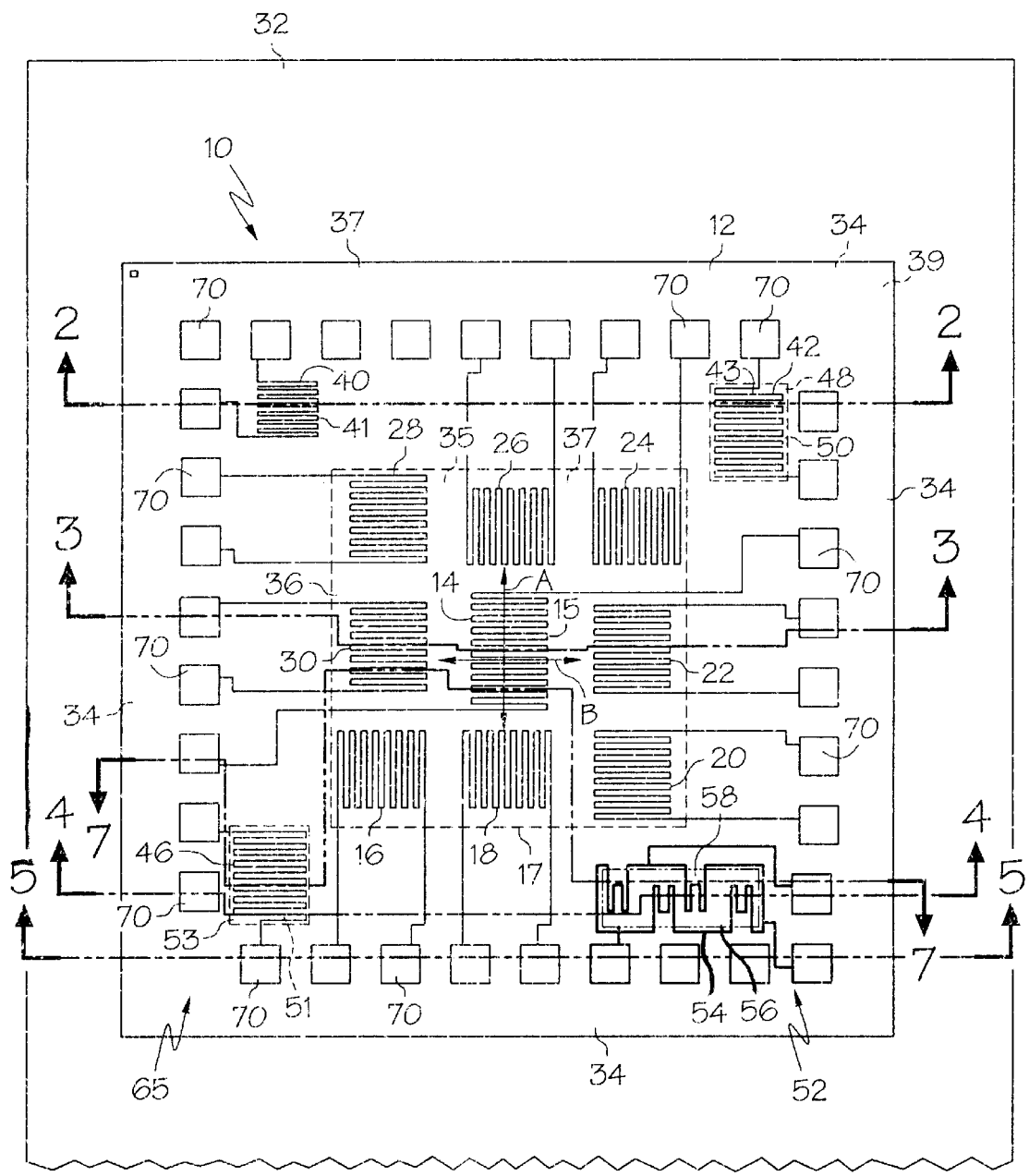
FIG. 1 is a top view of one embodiment of the flow sensor of the present invention, with the protective layer removed for illustrative purposes.

As shown in FIG. 1, the flow sensor of the present invention, generally designated 10, includes die 12, and is located on a surface 32 for detecting the velocity and direction of fluid flowing across the surface 37. The die 12 may be mounted in a recess 21 of the surface 32 such that the top of the die 12 is flush with the surface 32, as shown in FIG. 3. As best shown in FIGS. 2–5, the die 12 includes a substrate 34 that is centrally located on the width of the die 12. The substrate 34 may be a portion of a silicon wafer, but can also be made from a variety of materials including silicon carbide, germanium, polyimide, glass or ceramics. Silicon is the preferred material for the substrate 34 because its thermal conductivity ensures a generally uniform temperature throughout the substrate. A top layer 37 and a bottom layer 13 are located on the substrate 34, and a conductive layer 65 is located on top of the top layer 37. Finally, an upper protective layer 49 coats the exposed surfaces of the top layer 37 and conductive layer 65. The top 37, bottom 13 and protective 49 layers are preferably made of a dielectric or insulating material, such as polyimide or silicon nitride, but can be made of nearly any material, including the same material of the substrate 34.

Figure 6:
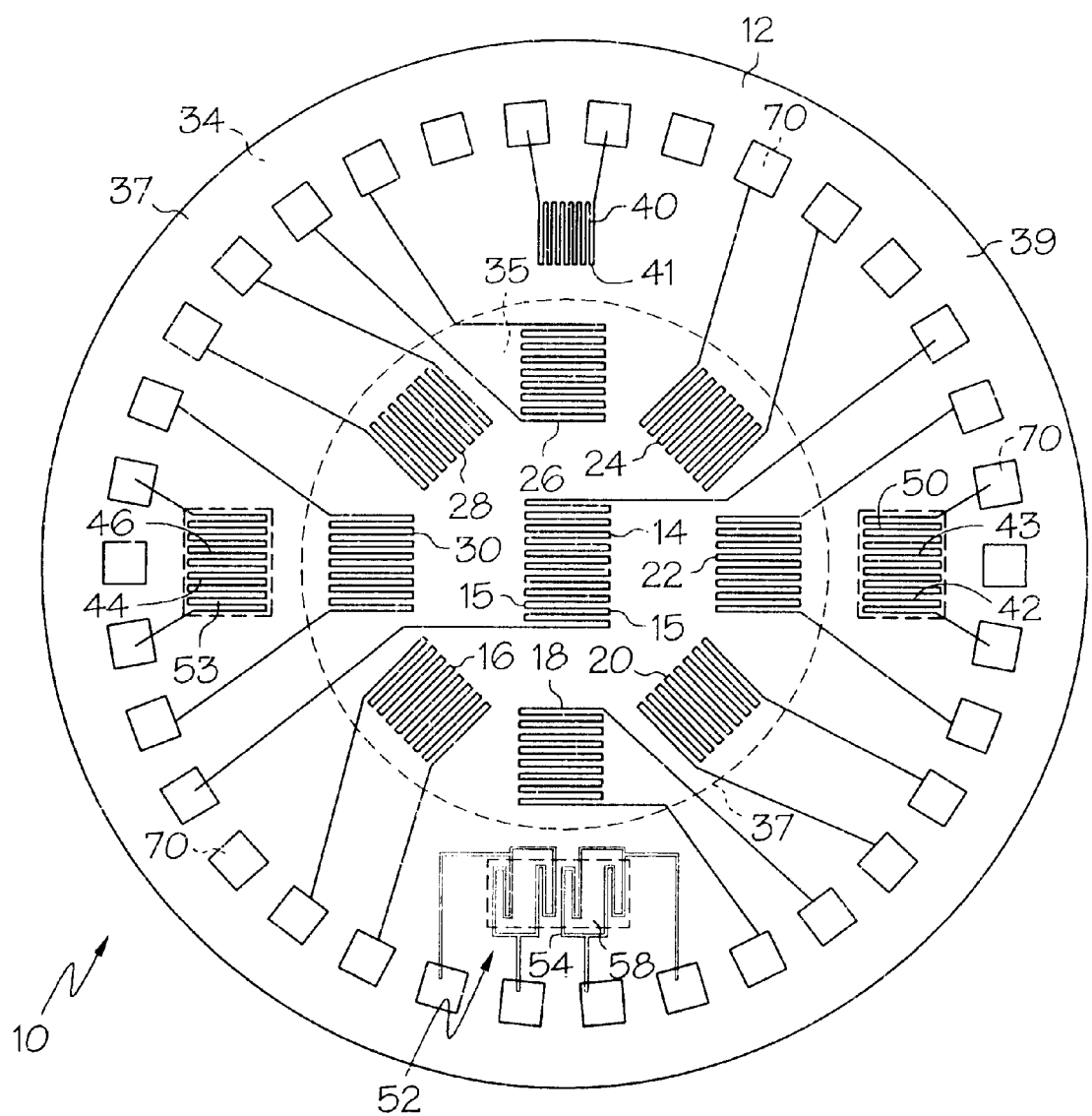
FIG. 6 is a top view of an alternate embodiment of the present invention, with the protective layer removed for illustrative purposes.

As will be discussed in greater detail below, the conductive layer 65 is preferably made of thermoresistive and piezoresistive materials and includes the conductive portions of a heat source or heater 14, heat sensors 16, 18, 20, 22, 24, 26, 28, 30, a substrate temperature sensor 40, a pair of fluid temperature sensors 42, 44, a pressure sensor 52 and a plurality of connecting pads 70 (see FIGS. 1 and 6). The top layer 37, bottom layer 13, conductive layer 65 and protective layer 49 are quite thin as compared to the substrate 34, and their thickness is exaggerated in the drawings for illustrative purposes.

As shown in FIG. 1, the flow sensor 10 includes the heat source or heater 14 located on the die 12, and the heat sensors 16, 18, 20, 22, 24, 26, 28, 30 are located on the die 12 around the heat source. The heat source 14 includes a heat source resistor 15, and each heat sensor 16, 18, 20, 22, 24, 26, 28, 30 includes a heat sensor resistor. The heat source resistor 15 and heat sensor resistors may be made of thermoresistive material formed in a generally serpentine shape in a well known manner as shown in FIG. 1. As used herein, the term "thermoresistive" means a material having a resistivity that varies with temperature; that is, the material has a non-zero temperature coefficient of resistance.

The heat source 14 and heat sensors 16, 18, 20, 22, 24, 26, 28, 30 are connected to a processor (not shown) to monitor the temperature and/or heat sensed by the heat source and heat sensors. As best shown in FIG. 1, the sensor 10 or die 12 may be generally square in top view. However, as shown in FIG. 6, the sensor/die may also be circular in top view. The symmetrical nature of the circular sensor/die provides uniformity to fluid flowing over the die, regardless of which direction the fluid flows over the sensor/die. The sensor/die may also be a variety of other shapes beyond circular and rectangular.

As shown in FIGS. 1 and 3, the substrate 34 and bottom layer 13 extend around the perimeter of the die 12, defining a central opening 35 in the die 12. The outline of the central opening 35 is indicated by hidden line 17 in FIG. 1. The sensor 10 includes a diaphragm portion 36 (preferably made primarily of a portion of the top layer 37) located over the central opening 35. The top layer 37 also includes an outer portion 39 located over the substrate portion 34 and not located over the central opening 35 (see FIG. 3). The heat source 14 and heat sensors 16, 18, 20, 22, 24, 26, 28, 30 are preferably located on the diaphragm portion 36 to thermally isolate the heat source 14 and heat sensors 16, 18, 20, 22, 24, 26, 28, 30 from the substrate 34 and surface 32. In other words, the thermal isolation of the components located on the diaphragm portion 36 is increased by removing material below the diaphragm portion 36. The term "substrate" as used herein can mean the layer of material 34, or more broadly, the thick band or ring of material that extends around the central opening 35 (in other words, the portion of the die not including the diaphragm portion 36).

Figure 2:
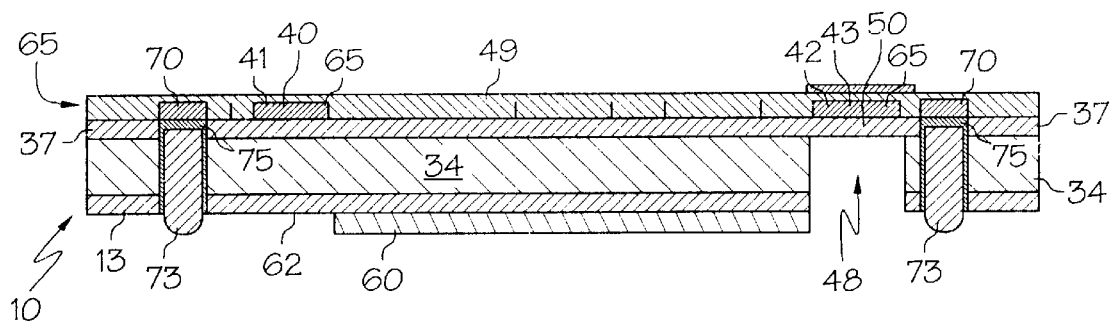
FIG. 2 is a cross section of the flow sensor of FIG. 1, taken along line 2—2 of FIG. 1.
Figure 3:
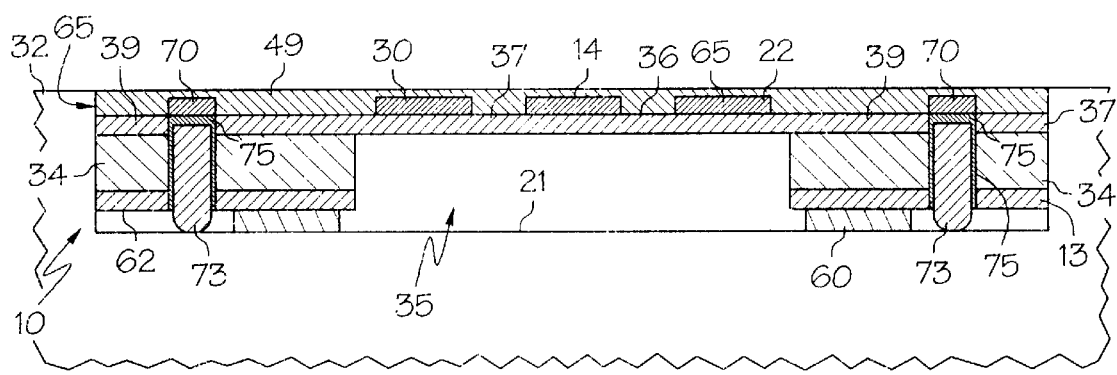
FIG. 3 is a cross section of the flow sensor of FIG. 1, taken along line 3—3 of FIG. 1 and illustrating the sensor mounted flush with a surface.

As shown in FIGS. 1 and 2, the sensor 10 includes a substrate temperature sensor 40 located above the substrate 34 and between the top layer 37 and protective layer 49. The substrate temperature sensor 40 is located above the substrate 34 (i.e., on the outer portion 39 of the top layer 37) to detect the temperature of the substrate 34. The substrate temperature sensor 40 includes a substrate temperature resistor 41 may be made of a thermoresistive material formed in a serpentine shape as is well known in the art, as shown in FIGS. 1 and 6. Alternately, thermopile technology may be used to sense the temperature of the substrate 34 in place of the substrate temperature sensor 40.

Figure 4:
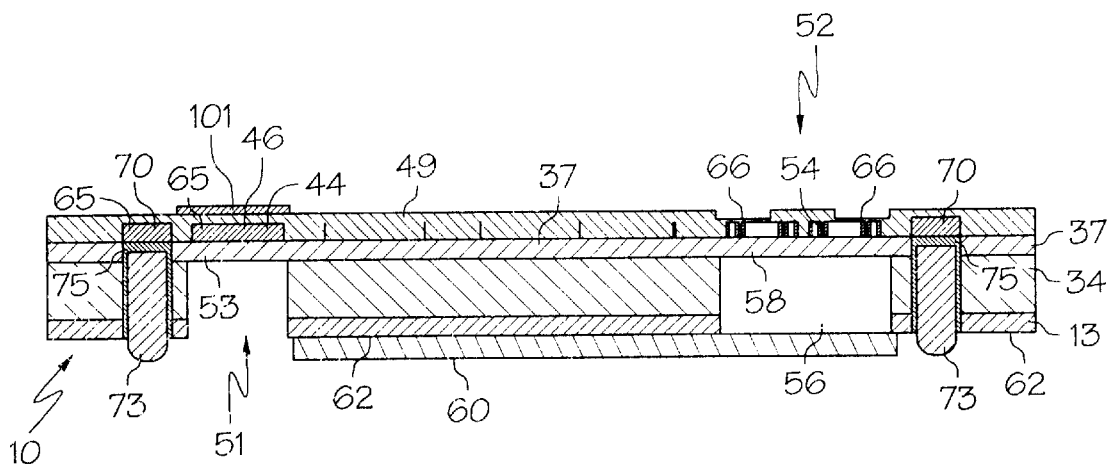
FIG. 4 is a cross section of the flow sensor of FIG. 1, taken along line 4—4 of FIG. 1.

The sensor 10 also includes a pair of cavities 48, 51 formed in the substrate 34 (see FIGS. 1, 2 and 4). The sensor 10 further includes a pair of fluid temperature sensors, generally designated 42, 44, located on top of a thin film of the top layer 37 located above the cavities 51, 48, respectively. Fluid temperature sensor 42 includes a fluid temperature sensor resistor 43 made of thermoresistive material and formed in a serpentine shape, as is well known in the art and shown in FIG. 1. Similarly, fluid temperature sensor 44 includes a fluid temperature sensor resistor 46. The top layer 37 forms relatively thin fluid temperature sensor diaphragm portions 50, 53 located on top of the under cavities 48, 51. The under cavities 48, 51 help to thermally isolate the fluid temperature sensors 42, 44 from the substrate 34 and surface 32 (FIG. 1).

The fluid temperature sensors 42, 44 can be located on nearly any location of the die 12. However, the fluid temperature sensors 42, 44 are preferably located outside of any significant isotherms created by the heat source 14. Thus, the directionality of the fluid flow should be considered in determining the placement of the fluid temperature sensors 42, 44 or the orientation of the sensor 10. For example, the fluid temperature sensors 42, 44 should preferably be located upstream of the heat source 14 to minimize sensing any heat generated by the heat source 14. If desired, the sensor 10 may include a plurality fluid temperature sensors, and only those fluid temperature sensors that are located upstream of the heat source 14 at any given time may be used. This enables the sensor 10 to be used with flows of varying direction.

The sensor 10 further includes a pressure sensor, generally designated 52 (FIGS. 1 and 4). The pressure sensor 52 includes a set of pressure sensor resistors 54, preferably made of stress-resistive or piezoresistive materials deposited on the top layer 37 and formed in a generally serpentine shape as is well known in the art. The pressure sensor 52 further includes a pressure cavity 56 (FIGS. 1 and 4) formed in the substrate 34 such that the top layer 37 forms a relatively thin pressure sensor diaphragm portion 58 at the top of the pressure cavity 56. The pressure sensor diaphragm portion 58 flexes with varying pressures. The flexure of the pressure sensor diaphragm portion can be detected by the pressure sensor resistor 54, similar to the operation of a strain gage to determine the pressure exerted on the pressure sensor 52 as is well known in the art. The heat source 14, heat sensors 16, 18, 20, 22, 24, 26, 28, 30, substrate temperature sensor 40, fluid temperature sensors 42, 44, and pressure sensor 52 are together termed the "upper electronics."

The upper electronics, besides the pressure sensor, can be made from a single layer of thermoresistive material, and the pressure sensor can be made from a layer of pressure sensitive material in place of, or on top of or under the layer of thermoresistive material. Alternately, a layer of material (such as conductive layer 65) that is both thermoresistive and pressure sensitive (such as polysilicon, platinum, nickel-iron, nickel-chrome, or other materials) can be used to form all of the upper electronics, including the pressure sensor 52. The use of separate thermoresistive and pressure sensitive materials provides improved accuracy in the resultant sensor. In contrast, the use of a single material that is both thermoresistive and pressure sensitive provides ease of manufacturing.

The sensor 10 may include a plate 60 located across the bottom surface 62 of the substrate 34 to seal the pressure cavity 56 (see FIG. 4). The plate 60 is used when an absolute pressure measurement is desired to be measured, and the plate may be omitted when a relative pressure is desired to be measured by the pressure sensor 52. The plate 60 may be glass thermal isolator frit bonded to the bottom surface 62. In this manner, the pressure cavity 56 can be maintained at a reference pressure, such as a near-vacuum. The pressure sensor diaphragm portion 58 may be embossed to increase the flexibility of the pressure sensor diaphragm portion without unduly compromising the strength and integrity of the pressure sensor diaphragm portion. The embossing, or "notching out" of the pressure sensor diaphragm portion is shown as notches 66 formed in the protective layer 49 in FIG. 4, and increases the sensitivity of the pressure sensor 52 while maintaining a relatively high overpressure value (that it, the sensitivity of the pressure sensor 52 is increased while maintaining its ability to withstand high pressures).

As shown in FIGS. 2–5, the upper electronics are formed of the conductive layer 65 and located on the top layer 37 so that the upper electronics are electrically isolated from the substrate 34. The upper electronics (besides the pressure sensor) may all be made primarily of material having a non-zero temperature coefficient of resistance, otherwise known as resistive temperature devices or resistive temperature detectors ("RTDs"). However, a wide variety of electronics, beyond RTDs, may be used as the upper electronics without departing from the scope of the present invention. As noted above, the pressure sensor resistor 13 may be made of piezoresistive materials. The protective layer 49, preferably another layer of silicon nitride, is preferably located on top of the upper electronics and the die 12 to generally seal and protect the upper electronics and the top surface of the sensor 10.

Of course, a variety of heat/temperature sensors may be used in place of the heat sensors 16, 18, 20, 22, 24, 26, 28, 30, fluid temperature sensors 42, 44, or substrate temperature sensor 40 shown herein, including but not limited to thermocouples or thermopiles. A variety of heat sources besides the heat source 14 shown herein may also be used, and a variety of pressure sensors beyond the pressure sensor shown herein, including but not limited to piezoelectric or piezoresistive pressure sensors, can be used without departing from the scope of the present invention.

Figure 5:
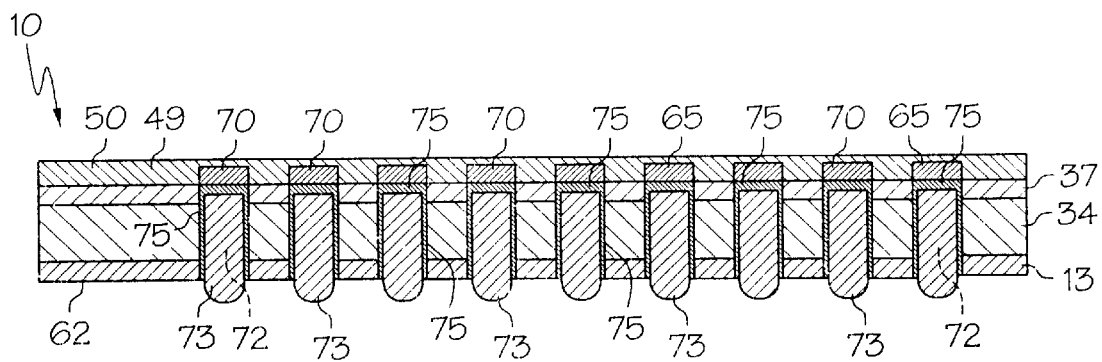
FIG. 5 is a cross section of the flow sensor of FIG. 1, taken along line 5—5 of FIG. 1.
Figure 13:
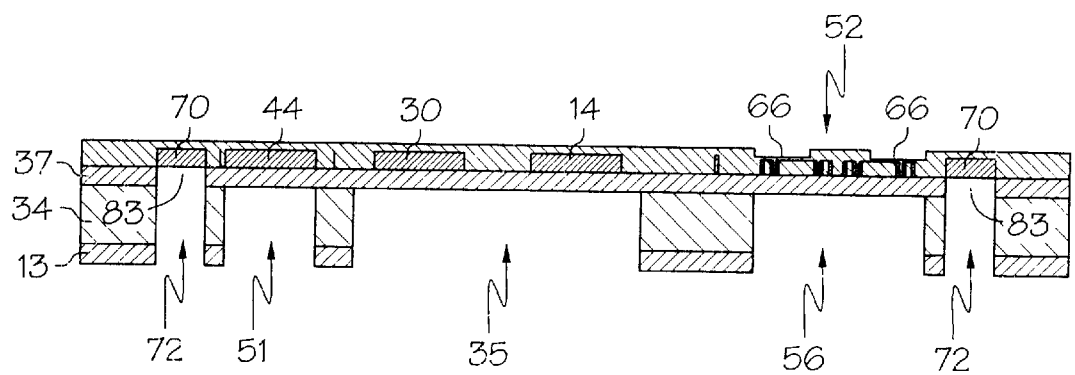

As best shown in FIGS. 1 and 5, the sensor 10 may include a plurality of conductive connecting pads 70 located around the perimeter of the substrate 34 of the die 12. Each connecting pad is coupled to one of the components of the upper electronics. The connecting pads 70 provide a surface to which wires, solder connections, or the like can be coupled to connect the upper electronics to an external processor. As best shown in FIGS. 5 and 13, in one embodiment the connecting pads 70 can be accessed through the "back side," or bottom surface 62, of the sensor 10. This type of attachment method is also termed "through-wafer bonding." Because the solder connections 73, wires or other attachments extend outwardly from the back side of the sensor 10, the solder connections 73, wires or other attachment schemes are not exposed to the fluid which flows across the top surface 50 of the sensor.

Thus, the use of through-wafer bonding helps to isolate the solder connections, attachment scheme or wires that are connected to the connecting pads from potentially corrosive environments flowing across the top of the sensor. The through-wafer bonding also ensures that the solder connections, wires or attachment schemes do not disrupt the fluid flowing over the sensor 10. Furthermore, locating the solder connections, wires or attachment schemes on the back side of the sensor 10 helps the sensor to present a lower aerodynamic profile to reduce recirculation zones and turbulence over the sensor. In many settings it is also easier to connect the connecting pads 70 through the back side of the sensor 10.

However, it is not required that the sensor include through-wafer bonding, and in one embodiment the connecting pads 70 of the die 12 can be accessed from the top surface 50 of the die 12, in a conventional, known manner. In this case, portions of the protective layer located over the connecting pads 70 would be removed to expose the connecting pads 70.

In the illustrated embodiment (see FIG. 5), each connecting pad 70 is electrically coupled to a solder connection 73 via a trimetal layer 75 as is well known in the art. The solder connection 73 may be patterned in a variety of shapes on the bottom surface 62 of the sensor 10 such that the sensor 10 can be connected to an external processor with a conventional electrical attachment scheme (such as solder flip-chip, ball-grid array or metal-to-metal thermal compression). The trimetal layer 75 ensures good bonding and good ohmic contact between the solder connections 73 and the connecting pads 70, although other methods for ensuring bonding and ohmic contact may also be used. Thus, the solder connections 73 provide a convenient surface upon which wires or other connections can be bonded to electrically couple the upper electronics to a processor, such as a computer, CPU, readout circuitry or other controller (not shown), and are located on the bottom surface 62 of the sensor 10.

As shown in FIG. 1, the heat sensors 16, 18, 20, 22, 24, 26, 28, 30 are located around the central heat source 14. In this manner, when fluid flow flows across the top surface of the flow sensor 10, the magnitude and direction of the fluid flow can be accurately determined. In the illustrated embodiment, eight heat sensors are utilized; however, this number may be increased or decreased as desired, preferably not below two heat sensors. It has been found that four heat sensors provides an accurate, low cost arrangement.

When only two heat sensors are utilized, the heat sensors and heat source 14 are preferably arranged in a non-linear orientation. In this manner, the sensor 10 can measure a broader range of directions of fluid flow over the sensor and is "multidirectional" in that it can sense the direction and magnitude of fluid flow in a variety of directions. When only two heat sensors are utilized, each of the two heat sensors and the heat source 14 form separate axes, and the two axes are preferably non-parallel. Further preferably, the axes are generally perpendicular. For example, when only two heat sensors are used (i.e., heat sensor 26 and heat sensor 22 of FIG. 1), heat sensor 26 forms a first line or axis A with the heat source 14, and the heat sensor 22 forms a second line or axis B with the heat source that is perpendicular to the first axis A. The heat source 14 is preferably located at the intersection of the two axes A, B.

Figure 18:
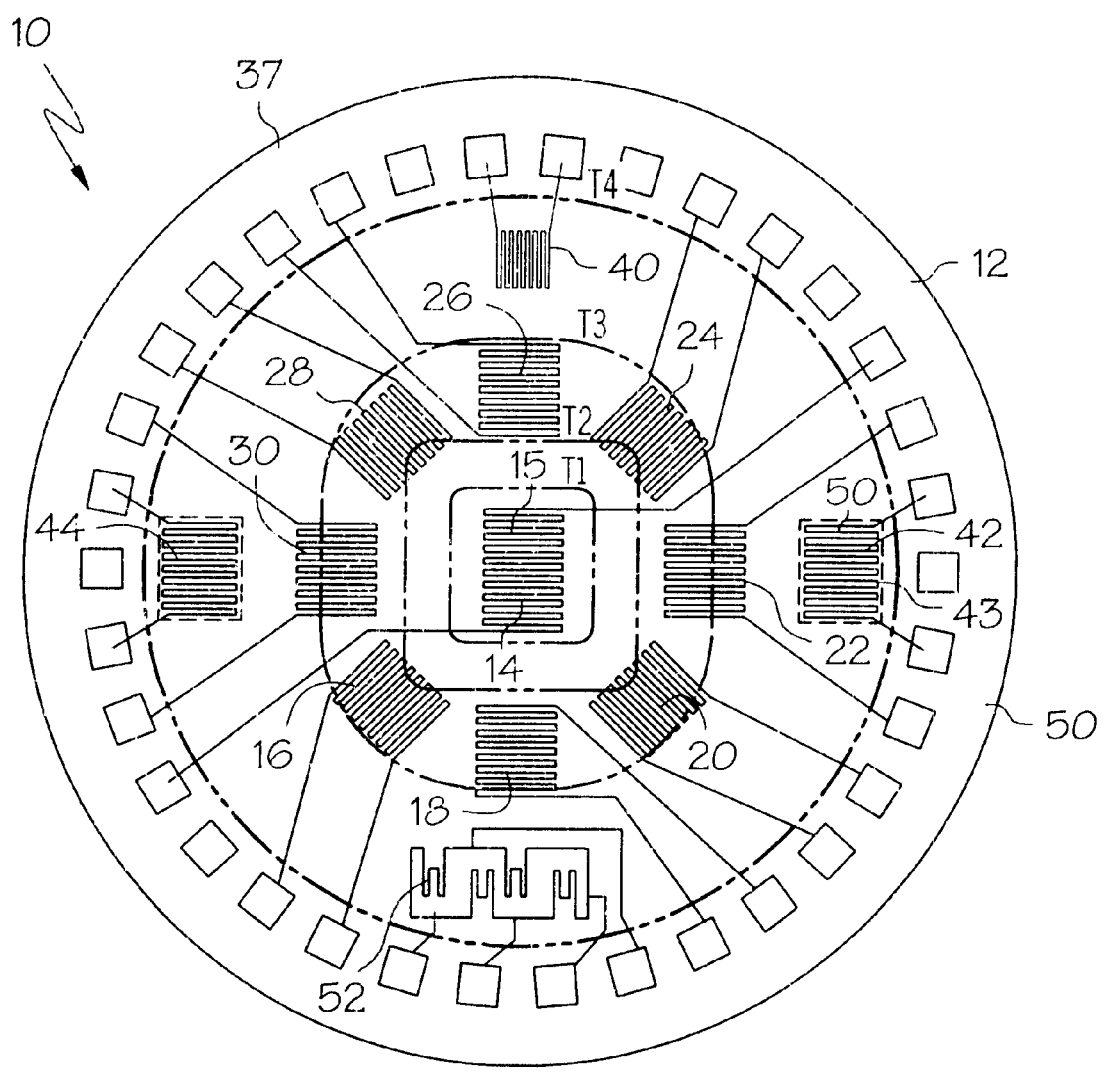
FIG. 18 is a top view of the sensor of FIG. 6, illustrating a set of isotherms about the sensor in the absence of fluid flow.

In operation, the heat source 14 is heated to a predetermined temperature to set up a heat profile of isotherms about the heat source (i.e. see isotherms T1, T2, T3 and T4 of FIG. 18). Because the heat source 14 may be made of a thermoresistive material, the temperature of the heat source 14 can be determined by monitoring the resistance of the heat source 14. The heat source 14 may also be made of non-thermoresistive materials, but if the heat source 14 is made of non-thermoresistive materials, a separate heat source temperature sensor (not shown) may be provided to monitor the temperature of the heat source 14. The heat sensors 16, 18, 20, 22, 24, 26, 28, 30 are located adjacent the heat source 14 so that they can detect at least a portion of the heat generated by the heat source.

In order to generate heat, a current is passed through the heat source resistor 15. Power generated in the conductive materials of the heat source 14 is governed by the equation $P=I^2R$. Simultaneously, a low level current is passed through the heat sensors 16, 18, 20, 22, 24, 26, 28, 30 and the resistivity of the heat sensors is monitored. The current passed through the heat sensors may be maintained at a low level to minimize heat generated by the heat sensors. Because the resistivity of the heat sensors 16, 18, 20, 22, 24, 26, 28, 30 varies with temperature, the temperature field around the heat source 14 can be monitored.

Figure 19:
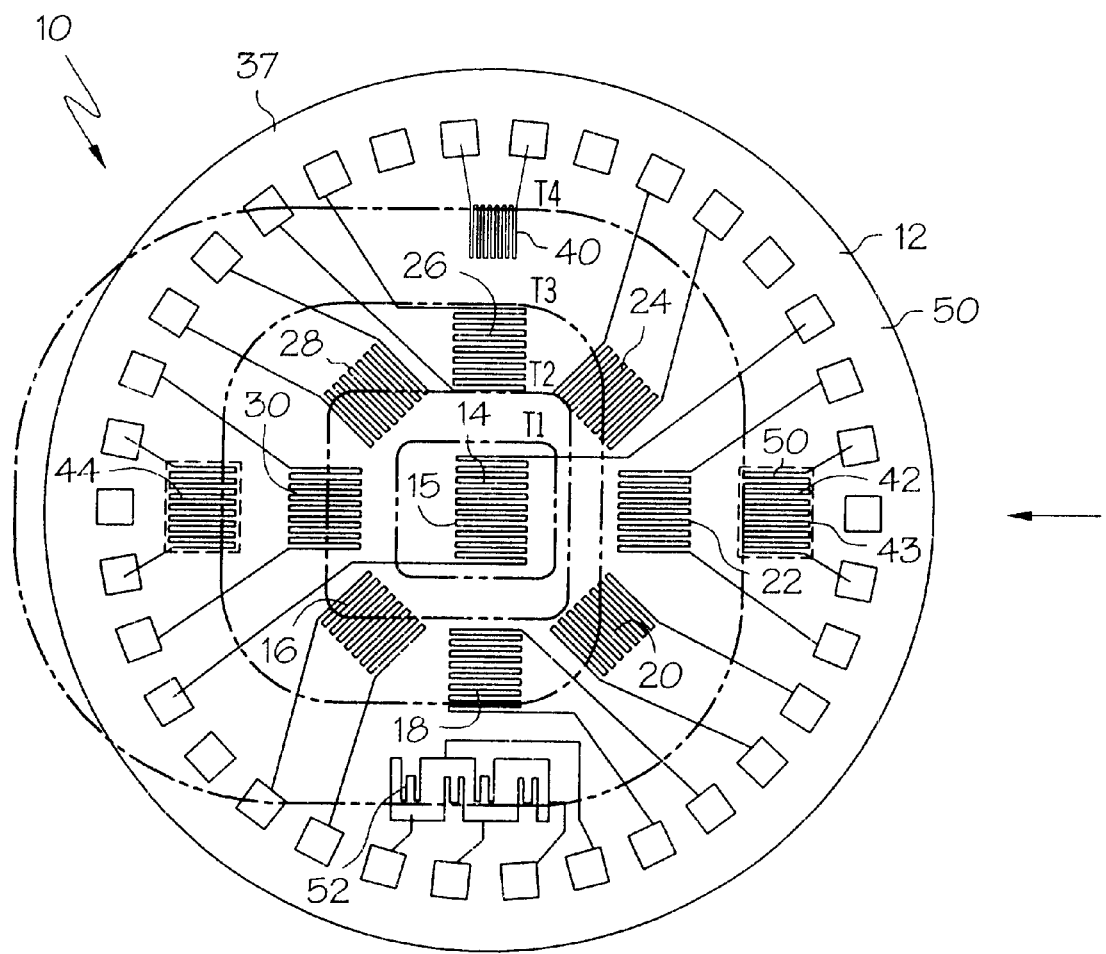
FIG. 19 is a top view of the sensor of FIG. 18, illustrating the isotherms in the presence of fluid flow.

The heat sensors 16, 18, 20, 22, 24, 26, 28, 30 located around the heat source 14 detect heat and/or their local temperatures and send their output to the processor such that the processor can determine the temperature/heat distribution pattern around the heat source 14. When a fluid flows across the top surface 50 of the sensor 10, the isotherms are distorted in the direction of the fluid flow (i.e., see FIG. 19), which can be detected by the heat sensors 16, 18, 20, 22, 24, 26, 28, 30 and processor. For example, a heat sensor 22 located upstream of the heat source 14 should detect a lower temperature/less heat than a heat sensor 30 located downstream of the heat source. The velocity and direction of the fluid flowing across the sensor 10 can then be determined by mathematical formulas, algorithms and/or look up tables as is well known in the art.

The fluid temperature sensors 42, 44 are used to determine the (preferably upstream) temperature of the fluid flowing over the sensor 10. The substrate temperature sensor 40 is used to detect the temperature of the substrate 34. The temperature of the heat source 14 and the substrate temperature sensor 40 are fed to the processor, and a constant difference in temperature ($\Delta T$) is preferably maintained between the heat source 14 and the substrate 34. It has been found that maintaining a constant $\Delta T$ between the heat source 14 and the substrate 34 increases the range of absolute temperatures over which the sensor 10 may operate. Maintaining a constant $\Delta T$ therefore improves the sensitivity of the sensor 10 over a wider range of temperatures. The output of the fluid temperature sensors 42, 44 and substrate temperature sensor 40 may also be used for temperature compensation calculations in determining the velocity and direction of the fluid flow over the sensor 10.

In an alternate embodiment, each heat sensor 16, 18, 20, 22, 24, 26, 28, 30 may be used as a heat source, and the power required to maintain each "heat sensor" at a constant temperature is monitored to determine the heat lost by the heat sensors. The power required by each heat sensor to maintain that heat sensor at a predetermined temperature can be measured by a processor. The power requirement data can then be used to calculate the velocity and direction of the fluid flow similar to the manner described above. In this embodiment, a separate heat source is not needed.

At higher fluid velocities, the pressure sensor 52 may be used to determine the velocity of the flow over the surface 32. For example, the pressure sensor 52 may act in conjunction with other pressure sensors (not shown), including other pressure sensors mounted onto other sensors 10, to calculate the speed of the fluid in a manner well known in the art. The pressure sensor 52 may be used as part of a plurality of pressure sensors mounted on the surface 32 to form a system or array of sensors to monitor a larger pattern of flow over a surface. In this case, the system or array of sensors may also any or all of the upper electronics, and not just the pressure sensors 52, to monitor the flow over the surface 32.

Due to the orientation of the heat sensors and heat source, the flow sensor 10 is "multidirectional" in that it can sense the direction and magnitude of fluid flow in a variety of directions. Furthermore, the sensor 10 includes multiple heat sensors, a heat source, a substrate temperature sensor 40, a pair of fluid temperature sensors 42, 44 and a pressure sensor 52 located on a single die 12. The power requirement for a single sensor including each of these components is lower than a number of separate sensors wherein each sensor includes one or more of the components. The flow sensor of the present invention may be a microsensor and in this case is quite small, for example, having a side length or radius of about 0.2 inches. The size of the sensor 10, and therefore its disturbance to flow, is decreased compared to using two or more sensors to accomplish the same result. Thus, the sensor 10 of the present invention provides a sensitive, compact, low-power and low-profile flow sensor.

FIGS. 7–17 illustrate one method for forming the flow sensor 10 shown in FIG. 1, although various other methods of forming the sensor 10 may be used without departing from the scope of the invention. The flow sensor 10 illustrated in these steps is a microsensor, and may be batch processed such that a plurality of sensors 10 are formed on a single wafer or wafers simultaneously. However, for ease of illustration, FIGS. 7–17 illustrate only a single flow sensor being formed. Furthermore, the manufacturing steps illustrated herein are only one way in which the sensor of the present invention may be manufactured, and the order and details of each step described herein may vary.

Figure 7:
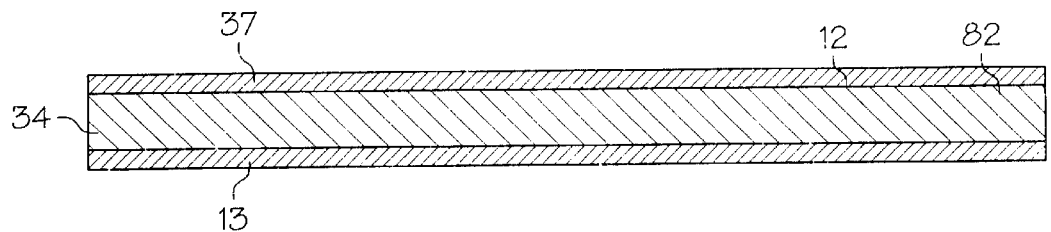
FIGS. 7–17 are a sequence of cross section views showing a series of steps that may be used to manufacture the flow sensor of FIGS. 1–5, taken along line 7—7 of the flow sensor of FIG. 1.
Figure 8:
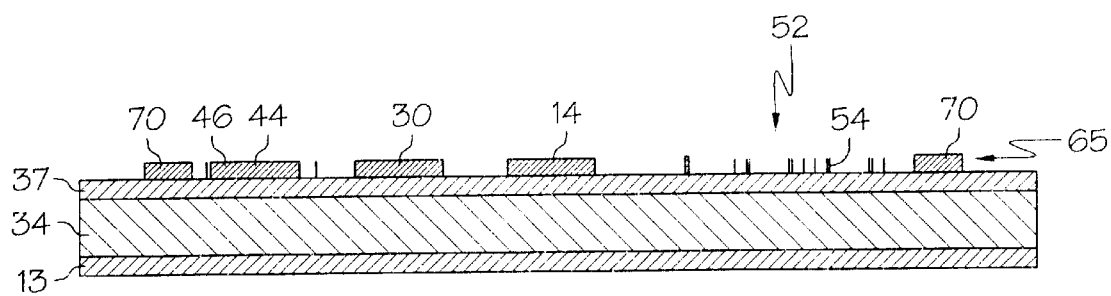

In order to manufacture the flow sensor 10, a wafer 82 of the desired material of the substrate 34, such as silicon, is provided, as shown in FIG. 7. A layer of dielectric or insulating material (such as silicon nitride) is deposited or grown onto the top and bottom of the wafer 82 to form the top layer 37 and bottom layer 13, respectively.

Next, the conductive layer 65 is deposited onto the top layer 37. As noted earlier, the conductive layer 65 may be both thermoresistive and piezoresistive such as polysilicon, platinum, nickel-iron, nickel-chrome, or other materials. The conductive layer 65 is then patterned, such as by photoetching or other techniques, to form the connecting pads 70, the resistor components of the heat source 14, heat sensors 16, 18, 20, 22, 24, 26, 28, 30, fluid temperature sensors 42, 44, substrate temperature sensor 40 and pressure sensor 52, and the connective wiring between the connecting pads 70 and the upper electronics.

As noted above, the conductive layer 65 may be both thermoresistive and piezoresistive. However, if the conductive layer 65 is not piezoresistive but is only thermoresistive, a portion of piezoresistive material is then deposited under, over, or in place the conductive layer 65 where the pressure sensor 52 will ultimately be formed.

Figure 9:
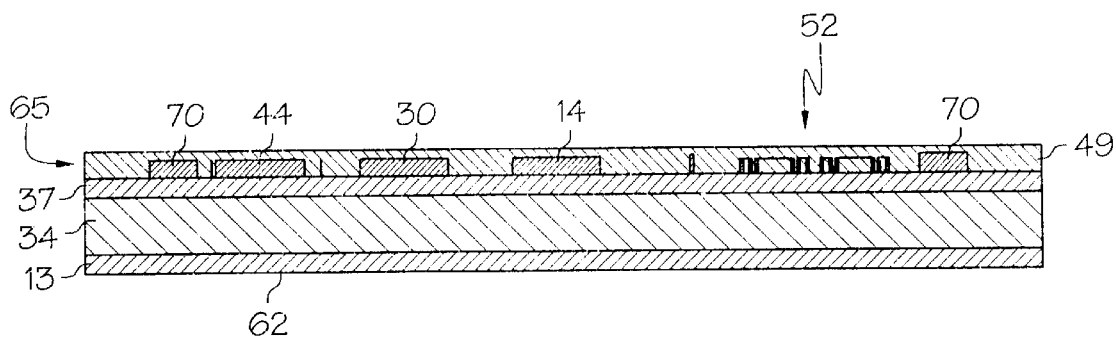
Figure 10:
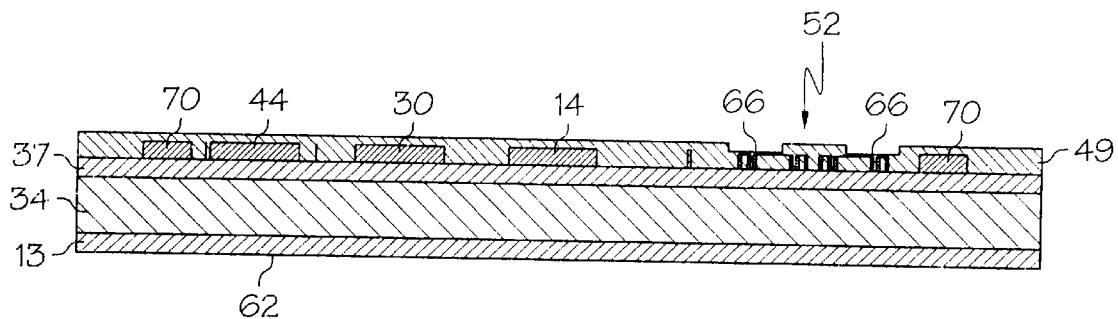

Next, as shown in FIG. 9, the protective layer 49 (such as silicon nitride, polyimide or other materials) is deposited on top of the conductive layer 65 and upper electronics. Next, as shown in FIG. 10, the protective layer 49 over the pressure sensor 52 may be embossed by forming notches 66, such as by dry etching. Although not illustrated herein, the embossing could also be "preformed" on the wafer 82 by embossing the underside of what will ultimately be the diaphragm 58 by forming mesas in the substrate 34 before the top layer 37 is deposited on the wafer. In this case, the mesas would be formed on the substrate 34 below the position at which the diaphragm 58 will ultimately be formed.

Figure 11:
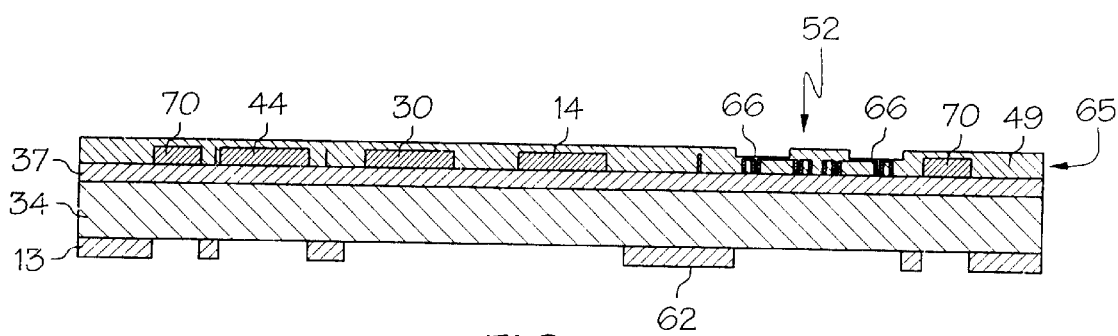
Figure 12:
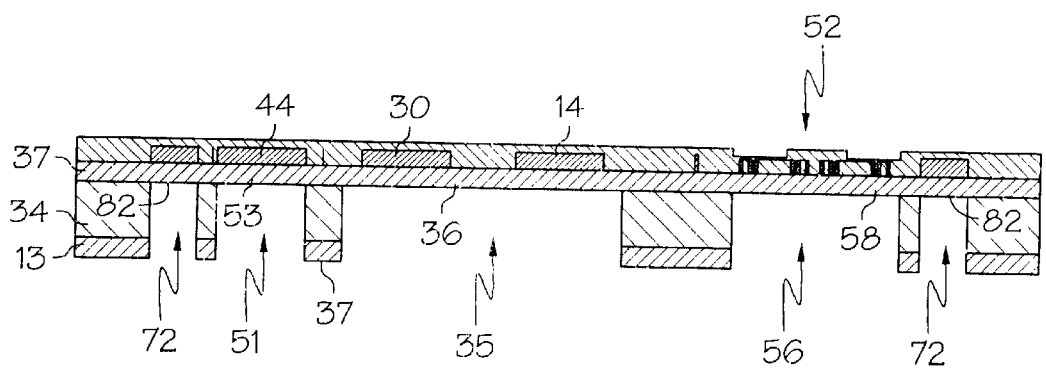

As shown in FIGS. 10 and 11, the bottom surface 62 of the wafer 82 is then etched to form the pressure cavity 56, under cavities 48, 51, central opening 35 and access apertures 72. In order to carry this out, as shown in FIG. 11, selected portions of the bottom layer 13 are removed, such as by dry etching techniques that are well known in the art. Next, the exposed surfaces of the wafer 82 (substrate 34) are etched (FIG. 12) to form the pressure cavity 56, under cavities 48, 51, central opening 35 and access apertures 72, as well as the associated pressure sensor diaphragm portion 58, fluid temperature sensor diaphragm portions 50, 53 and diaphragm portion 36. The pressure cavity 56, under cavities 48, 51 and central opening 35 may be formed by etching through the bulk of the wafer until the top layer 37 is exposed, although some thickness of the substrate 34 may remain if desired. The access apertures 72 are preferably formed such that each connecting pad 70 has an access aperture located below it. The etching during this step is preferably accomplished using reactive ion etching ("RIE") or deep reactive ion etching ("DRIE"). However, other etching methods, such as isotropic or anisotropic etching, as are well known in the art, may be used. DRIE etching is preferred because it will produce low undercut straight sidewalls, as opposed to angled side walls that result from anisotropic etching and undercutting that results from isotropic etching.

Next, as shown in FIG. 13, a set of vias 83 are formed in the upper surface 82 (FIG. 12) of each access aperture 72, the upper surface 82 being part of the top layer 37 in the illustrated embodiment. The vias 83 are formed by etching the top layer 37 (preferably by dry etching) to thereby expose at least a portion of the associated connecting pad 70.

Figure 14:
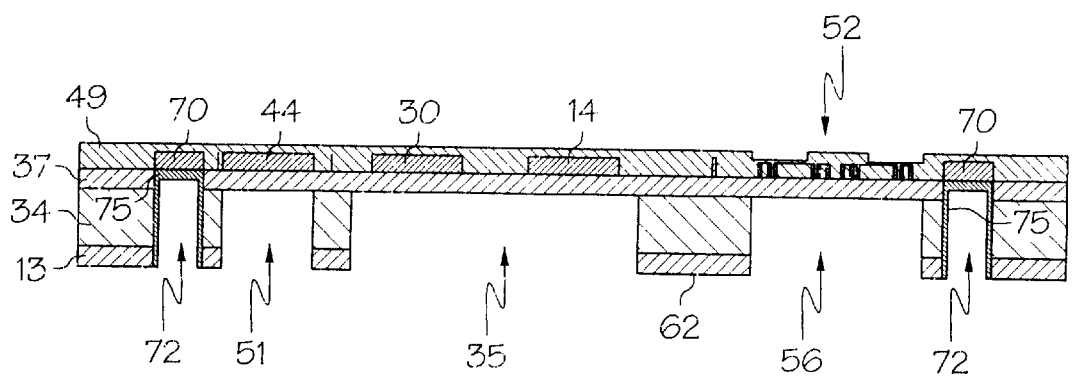
Figure 15:
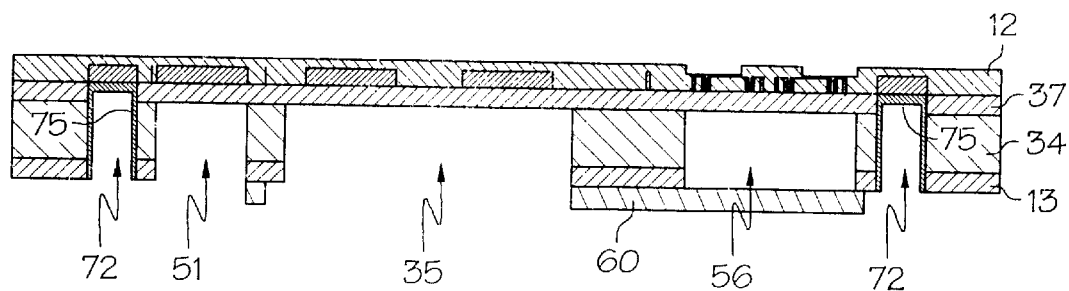

Next, the trimetal layer 75, such as, for example, titanium/tungsten/gold or zirconium/nickel/gold, is then applied (such as by sputtering, vapor deposition, or other methods) in a trimetal deposition on upper and side surfaces of the access apertures 72. The sputtered trimetal material 75 passes through the vias 83 and makes contact with the connecting pads 70, as shown in FIG. 14. The trimetal material 75 is selected so that it forms a strong bond and good ohmic contact with both the connecting pads 70 and solder connectors 73. Next, as shown in FIG. 15, a frit glass plate 60 is coupled to the bottom surface 62 of the die 12 to seal the pressure cavity 56, for example using, for example, a frit seal or a glass-to-silicon bonding process.

Figure 16:
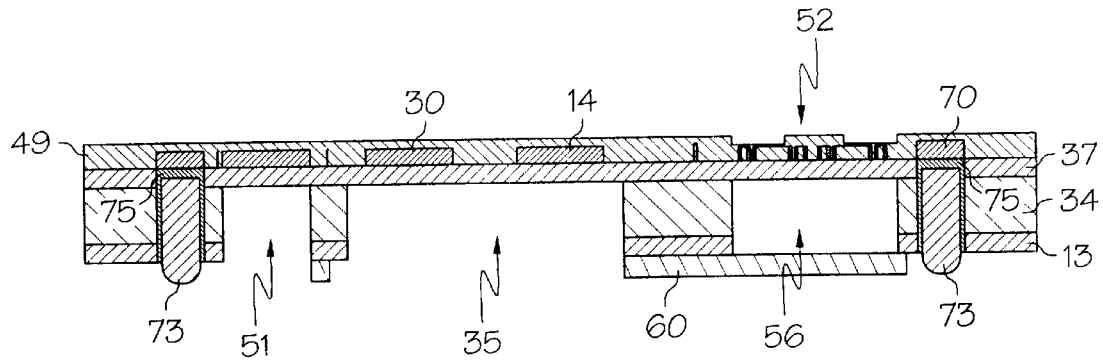
Figure 17:
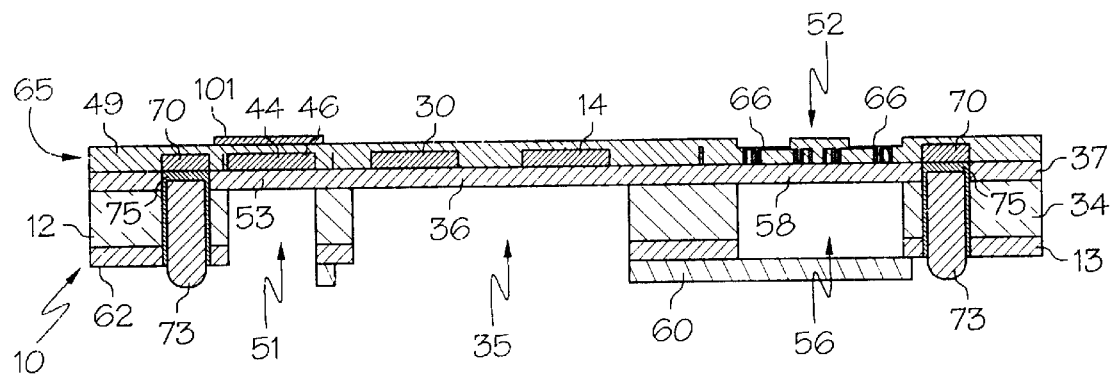

Next, as shown in FIG. 16, the solder connections 73 are deposited in the access apertures 72, preferably using electroplating to fill the access apertures 72 to ensure good contact with the trimetal layer 75. The solder connections can be patterned such that the sensor 10 can be connected to a processor with a conventional electrical attachment scheme (such as a solder flip-chip, ball grid array or metal-to-metal thermal compression). Finally, as shown in FIG. 17, a gold layer 101 or other thermally conductive material may be located on protective layer 49 above the fluid temperature sensors 42, 44 using standard deposition techniques. The gold layer 101 helps to ensure accurate and consistent thermal conductivity of the fluid to the sensors 42, 44. The sensor 10 is then separated from the wafer, such as by dicing, DRIE, scribing, or other methods. The sensor may then be mounted to a surface 32 (see FIG. 3) and connected to a controller or processor for use.

Having described the invention in detail and by reference to the illustrated embodiments, it will be apparent that modifications and variations thereof are possible without departing from the scope of the invention.

What is claimed is:

1. A flow sensor for determining the speed of a fluid flow comprising:
   a die including a relatively thick substrate portion and a thin diaphragm portion;
   a heat source located on said diaphragm portion of said die;
   a first and a second heat sensor located on said diaphragm portion of said die to detect at least a portion of heat generated by said heat source, said first and second heat sensors and said heat source being arranged in a non-linear orientation; and
   a pressure sensor located on said die for determining the pressure of said fluid flow.

2. The flow sensor of claim 1 further comprising a substrate temperature sensor located on said substrate portion for detecting the temperature of said substrate portion.

3. The flow sensor of claim 2 wherein said substrate temperature sensor includes material having a non-zero temperature coefficient of resistance having a generally serpentine shape.

4. The flow sensor of claim 1 wherein said die is primarily made of silicon, and wherein said heat source and said first and second heat sensors include material having non-zero temperature coefficient of resistance located on said die.

5. The flow sensor of claim 1 further comprising a processor coupled to said heat source and to said first and second heat sensors, wherein said processor can determine the amount of heat transmitted from said heat source to said first and second heat sensors to estimate the velocity of a fluid flow.

6. The flow sensor of claim 5 wherein said processor estimates the isotherms set up by said heat source in the presence of said fluid flow to estimate the velocity of said fluid flow.

7. The flow sensor of claim 1 further comprising a third and a fourth heat sensor located on said die, and wherein at least two of said heat sensors are aligned along a first axis and the other two of said heat sensors are aligned along a second axis.

8. The flow sensor of claim 7 wherein said first axis is generally perpendicular to said second axis.

9. The flow sensor of claim 7 wherein said heat source is located at the intersection of said first axis and said second axis.

10. The flow sensor of claim 7 further comprising fifth, sixth, seventh and eighth heat sensors located on said die to detect at least a portion of heat generated by said heat source.

11. The flow sensor of claim 1 further comprising an electrically insulating layer located between said die and said heat source and between said die and said heat sensors.

12. The flow sensor of claim 1 further comprising a plurality of conductive connecting pads, each connecting pad being electrically coupled to one of said heat source or said heat sensors.

13. The flow sensor of claim 12 wherein said die includes a first surface and a second surface opposite said first surface, said heat source and said heat sensors being located on said first surface, and wherein each connecting pad can be electrically coupled to a wire extending to said second surface.

14. The flow sensor of claim 13 wherein said die includes a plurality of access aperture, each access aperture extending from said second surface to one of said connecting pads.

15. The flow sensor of claim 14 wherein each access aperture includes a conductive material therein, said conductive material extending from said connecting pad to said second surface.

16. The flow sensor of claim 1 wherein said die includes a relatively thin fluid temperature sensor diaphragm portion, and wherein said flow sensor further includes a fluid temperature sensor located on said fluid temperature sensor diaphragm portion to detect the upstream temperature of said fluid which is substantially unheated by said heat source.

17. The flow sensor of claim 16 wherein said fluid temperature sensor includes material having non-zero temperature coefficient of resistance located onto said die and having a generally serpentine shape.

18. The flow sensor of claim 16 further comprising a layer of thermally conductive material located on said fluid temperature sensor improve the thermal conductivity of said fluid flow to said fluid temperature sensor.

19. The flow sensor of claim 1 wherein said die includes a relatively thin pressure sensor diaphragm portion, and wherein said pressure sensor is located on said pressure sensor diaphragm portion to detect the pressure of said fluid flow.

20. The flow sensor of claim 19 wherein said pressure sensor includes a pressure sensitive portion located on said pressure sensor diaphragm portion.

21. The flow sensor of claim 19 wherein said pressure sensitive portion includes a portion of piezoresistive material.

22. The flow sensor of claim 19 wherein said die includes a pressure cavity located below said pressure sensor diaphragm portion, and wherein said flow sensor further includes a plate located on a bottom surface of said die to seal said pressure cavity.

23. The flow sensor of claim 19 wherein said pressure sensor diaphragm portion is embossed.

24. The flow sensor of claim 19 further comprising a protective layer located on top of said heat source, said heat sensors and said pressure sensor, and wherein at least a portion of said protective layer is located on top of said pressure sensor is embossed.

25. The flow sensor of claim 1 further comprising a protective layer located on top of said heat source and heat sensors.

26. The flow sensor of claim 1 wherein said die is generally circular in top view.

27. The flow sensor of claim 1 wherein said flow sensor is a microsensor.

28. The flow sensor of claim 1 wherein each heat sensor is located on an upper surface of said die to detect at least a portion of heat generated by said heat source as carried by said fluid flow.

29. The flow sensor of claim 1 wherein said pressure sensor provides a variable output that is proportional to the pressure of the fluid flow.

30. A flow sensor for determining the speed of a fluid flow over said flow sensor comprising:
a die including a relatively thick substrate portion and a thin diaphragm portion;
a heat source located on said diaphragm portion of said die;
a first and a second heat sensor located on said diaphragm portion of said die to detect at least a portion of heat generated by said heat source, said first heat sensor and said heat source forming a first axis and said second heat sensor and said heat source forming a second axis, said first and said second axes being non-parallel; and
a pressure sensor located on said die for determining the pressure of said fluid flow.

31. The flow sensor of claim 30 wherein said first axis is generally perpendicular to said second axis.

32. The flow sensor of claim 30 wherein each heat sensor is located on an upper surface of said die to detect at least a portion of heat generated by said heat source as carried by said fluid flow.

33. The flow sensor of claim 30 wherein said pressure sensor provides a variable output that is proportional to the pressure of the fluid flow.

34. A flow sensor for determining the speed of a fluid flow over said flow sensor comprising:
a die;
a heat source located on said die, said heat source being connectable to a processor such that said processor can control the temperature of said heat source;
a heat sensor located on said die to detect at least a portion of heat generated by said heat source, said heat source being connectable to said processor to provide an output to said processor; and
a fluid temperature sensor located on said die for determining the upstream temperature of fluid which is substantially unheated by said heat source flowing over said die, said fluid temperature sensor being connectable to said processor to provide an output to said processor such that said processor can determine the speed of said fluid flow.

35. The flow sensor of claim 34 further comprising a pressure sensor located on said die for determining the pressure of said fluid flow.

36. The flow sensor of claim 34 further comprising a die temperature sensor located on said die for detecting the temperature of said die.

37. A flow sensor for determining the speed of a fluid flow over said flow sensor comprising:
a die;
a heat source located on said die, said heat source being connectable to a processor such that said processor can control the temperature of said heat source;
a heat sensor located on said die to detect at least a portion of heat generated by said heat source, said heat sensor being connectable to said processor to provide an output to said processor;
a pressure sensor located on said die for determining the pressure of said fluid flow; and
a die temperature sensor located on said die for determining the temperature of said die; said die temperature sensor being connectable to said processor to provide an output to said processor such that said processor can determine the speed of said fluid flow.

38. The flow sensor of claim 37 further comprising a fluid temperature sensor located on said die for detecting the temperature of said fluid.

39. The flow sensor of claim 37 wherein said pressure sensor includes a pressure sensor diaphragm and a piezoelectric element located on said pressure sensor diaphragm such that said piezoelectric element can measure deflection of said pressure sensor diaphragm.

40. The flow sensor of claim 39 wherein said piezoelectric element has a thickness of less than about a thickness of said pressure sensor diaphragm.

41. The flow sensor of claim 37 further comprising an auxiliary heat sensor located on said die to detect at lest a portion of heat generated by said heat source, said auxiliary heat sensor being connectable to said processor to provide an output to said processor.

42. A flow sensor for determining the speed of a fluid flow comprising:
a die;
a processor; and
a first, second and third heat sensor located on said die, said first, second and third heat sensors being arranged in a non-linear orientation and coupled to said processor such that said processor can monitor and directly control the temperature of said first, second and third heat sensors by maintaining said first, second and third heat sensors at a generally constant temperature for a predetermined period of time and thereby determine the speed of said fluid flow.

43. The flow sensor of claim 42 wherein said first, second heat and third sensors are resistors, and wherein said processor monitors the power required to maintain said heat sensors at said generally constant temperature, and processes the required power for each heat sensor to determine the velocity of flow over the flow sensor.

44. The flow sensor of claim 42 wherein said die includes a relatively thick substrate portion and a relatively thin diaphragm portion, and wherein said heat sensors are located on said diaphragm portion to thermally isolate said heat sensors from said substrate.

45. The flow sensor of claim 42 further comprising a die temperature sensor located on said die for detecting the temperature of said die, a pressure sensor located on said die for determining the pressure of said fluid flow, and a fluid temperature sensor located on said die for detecting a temperature of said fluid.

46. A method for determining the speed of a fluid flow comprising the steps of:
 providing a flow sensor comprising a die and a first and a second heat sensor located on said die;
 providing a processor;
 coupling said first and second heat sensors to said die such that an output of said first and second heat sensors is provided to said processor;
 causing a fluid to flow over said flow sensor;
 using said processor to maintain said first and second heat sensors at a generally constant temperature for a predetermined period of time as said fluid flows over said sensor; and
 monitoring said first and second heat sensors as said fluid flows over said sensor to determine said fluid speed.

47. The method of claim 46 wherein said monitoring step includes maintaining said first and second heat sensors at a constant temperature.

48. A method for determining the speed of a fluid flow comprising the steps of:
 providing a flow sensor comprising a die, a heat source located on a diaphragm portion of said die, a first and a second heat sensor located on said diaphragm portion of said die, said first and second heat sensors and said heat source being located in a non-linear orientation, and a pressure sensor located on said die for determining the pressure of said fluid flow;
 providing a processor;
 coupling said heat source and said first and second heat sensors to said processor such that an output of said first and second heat sensors is provided to said processor;
 causing a fluid to flow over said flow sensor;
 causing said processor to control the heat output by said heat source and monitor said first and second heat sensors to determine said fluid speed; and
 monitoring the pressure measured by said pressure sensor to determine said fluid speed.

49. A flow sensor comprising:
 a die;
 a speed sensor located on said die, said speed sensor being connectable to a processor to provide an output such that said processor can determine the speed of said fluid flow;
 a pressure sensor located on said die, said pressure sensor being connectable to a processor to provide an output such that said processor can determine the pressure of said fluid flow; and
 a fluid temperature sensor located on said die, said fluid temperature sensor being connectable to said processor to provide an output such that said processor can determine the upstream temperature of said fluid which is substantially unheated by said heat source.

50. The flow sensor of claim 49 wherein said die includes a relatively thin pressure sensor diaphragm portion, and wherein said pressure sensor includes a portion of piezoresistive material located on said pressure sensor diaphragm portion to detect the pressure of said fluid flow.

51. The sensor of claim 50 wherein said speed sensor and said fluid temperature sensor each include a resistor.

52. The sensor of claim 51 wherein said resistor of said speed sensor and said fluid temperature sensor each include material having a non-zero temperature coefficient of resistance formed in a generally serpentine shape.

53. The flow sensor of claim 52 further comprising a processor coupled to said speed sensor, said fluid temperature sensor and said pressure sensor to determine the speed, temperature, and pressure of said fluid.

54. The flow sensor of claim 53 wherein said processor maintains said resistor of said speed sensor at a constant temperature for at least part of the time, and said processor can monitor the power required to maintain the resistor at said constant temperature to calculate the speed of said fluid flow.

55. A flow sensor for determining the speed of a fluid flow comprising:
 a die;
 a heat source located on said die;
 a first and a second heat sensor located on said die to detect at least a portion of heat generated by said heat source, said first and second heat sensors and said heat source being arranged in a non-linear orientation; and
 a protective layer located on top of said heat source and said heat sensors.

56. A flow sensor for determining the speed of a fluid flow comprising:
 a die including a relatively thick substrate portion and a relatively thin diaphragm portion;
 a heat source located on said diaphragm portion of said die;
 a first and a second heat sensor located on said diaphragm portion of said die to detect at least a portion of heat generated by said heat source, said first and second heat sensors and said heat source being arranged in a non-linear orientation, wherein each heat sensor is located on an upper surface of said die to detect at least a portion of heat generated by said heat source as carried by said fluid flow; and
 a pressure sensor located on said die for determining the pressure of said fluid flow.

57. A flow sensor for determining the speed of a fluid flow over said flow sensor comprising:
 a die;
 a heat source located on said die, said heat source being connectable to a processor such that said processor can control the temperature of said heat source;
 a heat sensor located on said die to detect at least a portion of heat generated by said heat source, said heat sensor being connectable to said processor to provide an output to said processor;
 a pressure sensor located on said die for determining the pressure of said fluid flow, said pressure sensor including a pressure sensor diaphragm and a piezoelectric element located on said pressure sensor diaphragm such that said piezoelectric element can measure deflection of said pressure sensor diaphragm; and
 a die temperature sensor located on said die for determining the temperature of said die, said die temperature sensor being connectable to said processor to provide an output to said processor such that said processor can determine the speed of said fluid flow.

* * * * *